Dec. 28, 1948.  W. C. LAIDLAW  2,457,161
TIRE DEFLATION SWITCH
Filed Aug. 7, 1945
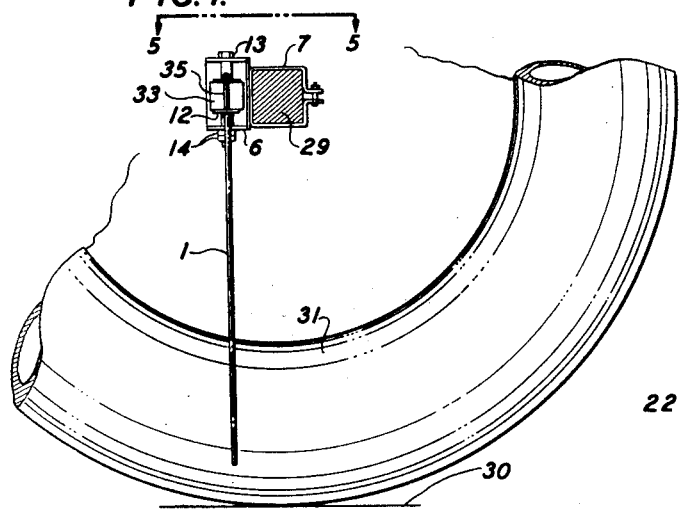
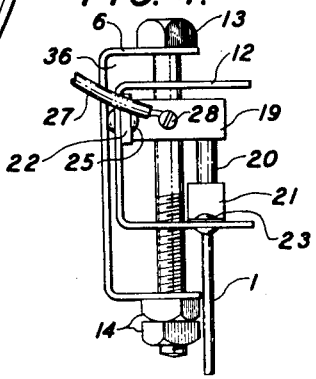
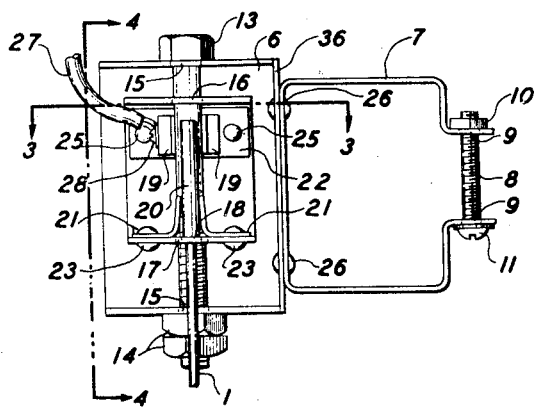
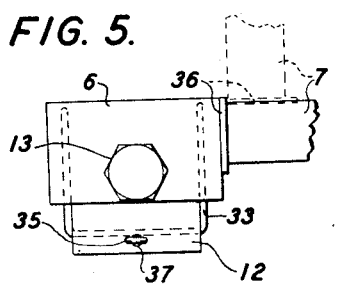
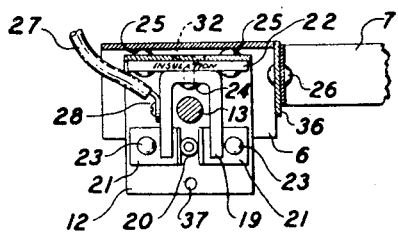
INVENTOR.
WILLIAM CLARK LAIDLAW
BY Christie & Angus
ATTORNEYS Patented Dec. 28, 1948

2,457,161

UNITED STATES PATENT OFFICE 2,457,161

TIRE DEFLATION SWITCH

William Clark Laidlaw, Pasadena, Calif.

Application August 7, 1945, Serial No. 609,368

3 Claims. (Cl. 200—58)

The invention relates to a device designed to automatically signal the operator of a vehicle equipped with pneumatic tires when one or more of the tires is underinflated. The device is also and more especially designed to automatically signal the driver of a vehicle pulling another vehicle, such as an automobile trailer, which is equipped with pneumatic tires when one or more of the tires of the trailer is underinflated.

The essential idea of this invention is a device consisting of a rod, or an equivalent member, and an electric circuit so constructed and so located on the vehicle that when the device is fastened to a vehicle with pneumatic tires, the rod will drag on the ground or on the side of a tire when the air pressure in the tire is insufficient to maintain adequate inflation of the tire, the drag of the rod on the ground or side of the tire causing a displacement of the rod from its normal position thereby closing an electric circuit. This closing of the electric circuit operates a signal indicating an underinflated tire.

One form of the invention is illustrated in the accompanying drawings. Figure 1 shows a general view of the device when attached to the axle of a vehicle. This general view is drawn to a smaller scale than are the other illustrations in order to show the relation of the device to the vehicle when attached to the vehicle in one of several possible ways. The preferable location of the device when attached to the axle is near one wheel so that when the tire on this wheel becomes underinflated, rod 1 is allowed to touch the ground sooner than would be the case were the device located further from the wheel.

Figure 2 is the same view of the device as shown in Figure 1, but drawn to a larger scale, with the cover removed in order to expose the various parts.

Figure 3 is a cross-sectional view taken along the line 3—3 of Figure 2. The cover is omitted.

Figure 4 is a view of the device taken along the line 4—4 of Figure 2 at right angles to that of Figure 2. The cover is omitted.

Figure 5 is a plan view taken along the line 5—5 of Figure 1.

Referring now to the drawings in which like characters of reference designate similar parts in the various views, Figures 1 to 5 inclusive illustrate one embodiment of my invention in which (referring to Figure 1) 29 designates an axle of a vehicle to which the device is attached, 30 the ground, and 31 a tire of the vehicle. In this particular method of installation, rod 1 is adjusted so that it normally clears the ground when the tire 31 is properly inflated.

Referring to Figures 2, 3, and 4, a strap 7 is attached to a supporting bracket 6 of the device by means of rivets 26 or in any other convenient way. Strap 7 is a means by which the device may be attached to the axle 29 of the vehicle; strap 7 being secured to the axle by means of bolt 8 which is inserted through holes 9 in the strap. The bolt may be screwed through nut 10 until the desired tightness is attained. A lock washer 11 may be placed under the head of the bolt to prevent vibration from loosening the bolt.

Movable plate 12 holds the activating switch of the device. In the form of the invention here illustrated, plate 12 is secured to the supporting bracket 6 by means of a bolt 13 equipped with two lock nuts 14. Bolt 13 extends through holes 15 in the flanges of bracket 6 and through holes 16 and 17 in the flanges of the movable plate 12. Holes 15, one in the top flange and one in the bottom flange of bracket 6 afford a running fit for bolt 13. Hole 16 in the top flange of movable plate 12 is the same diameter as holes 15. Hole 17 in the bottom flange of plate 12 is tapped to fit the threads of bolt 13. This arrangement allows an adjustment to be made in the heighth of rod 1 above the ground 30. Rod 1 may thereby be raised or lowered by merely turning bolt 13. Lock nuts 14 turn with bolt 13.

Rod 1 is the activating part of the device. In the particular form of the invention here illustrated, rod 1 rides loosely through hole 18 in the bottom flange of plate 12. Hole 18 is large enough so that when rod 1 touches the ground, any forward or backward motion of the vehicle will cause rod 1 to move through an angle sufficient to cause cylinder 20 on rod 1 to touch the contact point 19, thus closing the electric circuit to the signal. Rod 1 is held in position by means of the lower shoulder of cylinder 20 and springs 21. Cylinder 20 is attached to rod 1 by means of a press fit or in any other convenient way. Springs 21 hold rod 1 in a normal position midway between contact points 19 and are strong enough so that the motion and vibration of the moving vehicle will not cause cylinder 20 on rod 1 to touch contact points 19 unless rod 1 touches the ground. Rod 1 is preferably made of spring material. Springs 21 are attached to the lower flange of plate 12 by means of rivets 23 or in any other convenient way.

Contact points 19, in the embodiment here shown, consist of a single U-shaped piece attached to an insulating strip 22 by means of a rivet 24 or in any other convenient way. When contact 19 is riveted to strip 22, as in the case here illustrated, a hole 32, shown in Figure 3, is made in plate 12 at the location of this rivet, which hole is large enough so that the rivet 24 will not touch plate 12. Contact 19 may or may not consist of spring material. As shown here, contact 19 is a rigid piece. Insulating strip 22 is attached by rivets 25 or in any other convenient way to plate 12. The lead wire 27, which electrically connects contact 19 to the signal (an electric lamp in the present case) is attached to contact 19 by means of screw 28.

It may be here stated that if this device is used in such a way that the circuit is closed due to the side of the underinflated tire displacing rod 1 from its normal position, then in that case the device should be mounted at right angles to the way illustrated in Figure 1. This may be accomplished by bringing the side flange 36 of bracket 6 straight out from the face of bracket 6. The position of flange 36 and strap 7 then is as shown by the broken lines in Figure 5.

A cover 33, best illustrated in Figures 1 and 5, is shown in this embodiment of my invention to be a U-shaped plate which slips between the upper and lower flanges of plate 12. Pin 35 is inserted through two holes 37, one in the upper flange and one in the lower flange of plate 12 and prevents cover 33 from being dislocated.

The method of operation of my invention is more fully described as follows:

The entire device, which (except for insulating strip 22) is preferably made of an electrically conductive material such as iron, is fastened (in the case illustrated herein) to the axle of the vehicle. It is therefore grounded to the frame of the vehicle in an electrical sense, and since the battery of the vehicle or the battery of the automobile pulling the vehicle is similarly grounded to the frame, the device is connected to one side of the battery. If a tire on the vehicle to which the device is attached is underinflated to such an extent that rod 1 touches the ground, any forward or backward motion of the vehicle will cause the rod to move through an angle. This causes cylinder 20 to touch contact 19 thereby completing the electrical circuit through lead wire 27, the electric lamp, and back to the battery. In the case where the device is mounted on the vehicle in such a way that the displacement of rod 1 is caused by contact with the side of the underinflated tire instead of by dragging on the ground, said displacement of the rod causes cylinder 20 to touch contact 19 thereby completing the electrical circuit through lead wire 27, the electric lamp, and back to the battery. It is usually possible to connect lead wire 27 to that side of the switch of the vehicle which will allow the device to operate the signal only if the ignition key is turned on.

It can readily be seen from the explanation and illustrations of my invention that if the device is mounted on the vehicle in such a way that the displacement of rod 1 is caused by contact with the side of the underinflated tire, the electric lamp (or any other signal which this device operates) will respond the same whether the vehicle is standing still or in motion. Likewise, in the case where the device is mounted on the vehicle in such a way that the displacement of rod 1 is caused by contact with the ground, the signal which the device operates will respond the same whether the vehicle is standing still or in motion. In this case, (if the vehicle is standing still) rod 1 will press on the ground and be deflected in the form of an arc. This deflection will, as the tire near which the device is located becomes more and more underinflated, cause rod 1 to be displaced at its upper end the same as if the vehicle were in motion, thereby operating the signal just as if rod 1 were dragging on the ground.

The above explanation and description, together with the illustrations presented herewith, are deemed sufficient to convey a clear understanding of the purpose and operation of my invention. This specification is intended to show only a preferred embodiment of my invention, and in no way is to be construed as showing the only arrangement and form of its component parts. It is understood departures from this specification may be made without changing the fundamental ideas of the invention; therefore I claim:

1. In a tire deflection indicator, the combination which comprises a U-shaped plate having two arms extending one above the other, an operating lever fulcrumed to the lower arm with its lower end adapted to contact the ground, and with its upper end adapted to swing between the upper and lower arms, a supporting bracket adapted for attachment to a vehicle and within which the plate is vertically movable, a height adjusting bolt passing through the supporting bracket and through both arms of the plate and threaded into at least one of the pieces through which it passes, and an electrical contact member mounted within the U-shaped plate for electrical contact with the upper end of the lever.

2. Apparatus according to claim 1 in which the electrical contact member mounted within the U-shaped plate is itself U-shaped with arms projecting on either side of the upper end of the lever.

3. In a tire deflection indicator for a wheeled vehicle, the combination which comprises a U-shaped plate having two arms extending one above the other, a bracket for mounting the U-shaped plate to an axle of the vehicle so that the arms of the plate extend parallel to the longitudinal axis of the vehicle, an operating lever fulcrummed to the lower arm with its lower end extending adjacent a side wall of the tire, and with its upper end adapted to swing between the upper and lower arms upon displacement of the lower end in the direction of the transverse axis of the vehicle, said displacement resulting from spreading of the tire wall upon deflation thereof, a height adjusting bolt passing through the bracket and through both arms of the plate and threaded into at least one of the points through which it passes and an electrical contact member mounted within the plate for contact with the upper end of the lever.

WILLIAM CLARK LAIDLAW.

REFERENCES CITED

The following references are of record in the file of this patent:

UNITED STATES PATENTS

| Number | Name | Date |
|---|---|---|
| 1,580,782 | Gross | Apr. 13, 1926 |
| 1,638,983 | Crone | Aug. 16, 1927 |
| 1,646,164 | Moscate | Oct. 18, 1927 |
| 1,681,608 | Clark | Aug. 21, 1928 |
| 2,191,205 | Rogers | Feb. 20, 1940 |
| 2,258,334 | Miller | Oct. 7, 1941 |
| 2,334,849 | Toney | Nov. 23, 1943 |

FOREIGN PATENTS

| Number | Country | Date |
|---|---|---|
| 663,928 | France | Apr. 15, 1929 |